June 5, 1956 A. C. LINDNER 2,749,166
LATCH FOR AUTOMOBILE DECK CLOSURE
Filed Dec. 22, 1952 2 Sheets-Sheet 1
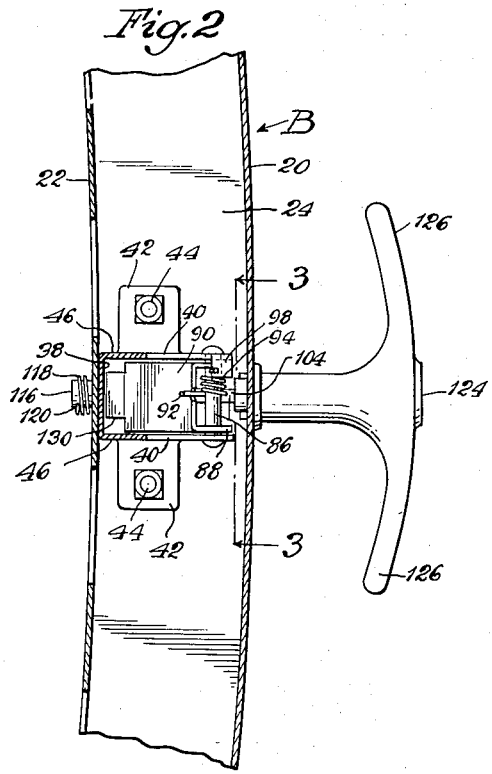
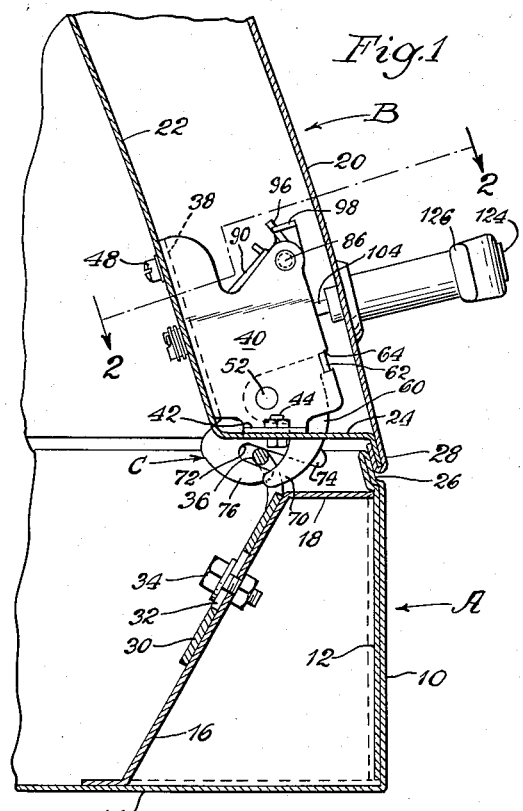
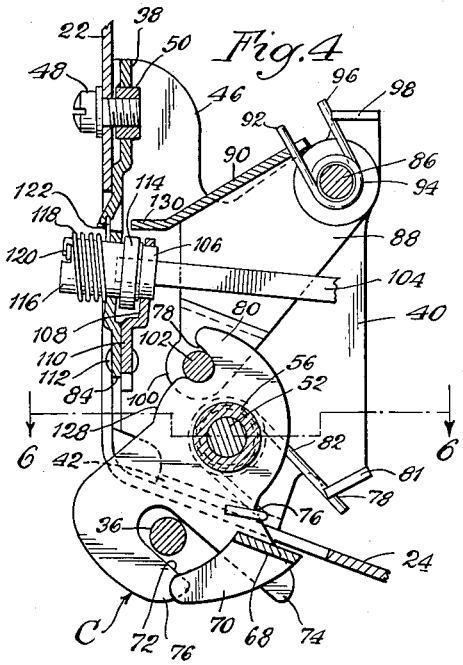
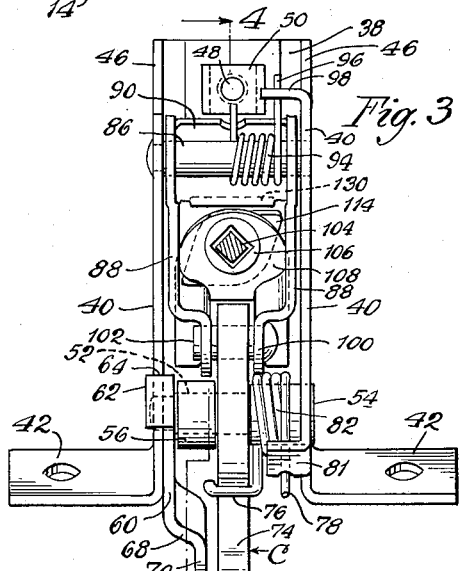
Inventor
Adam C. Lindner
by Parker & Carter
Attorneys June 5, 1956 A. C. LINDNER 2,749,166
LATCH FOR AUTOMOBILE DECK CLOSURE
Filed Dec. 22, 1952 2 Sheets-Sheet 2
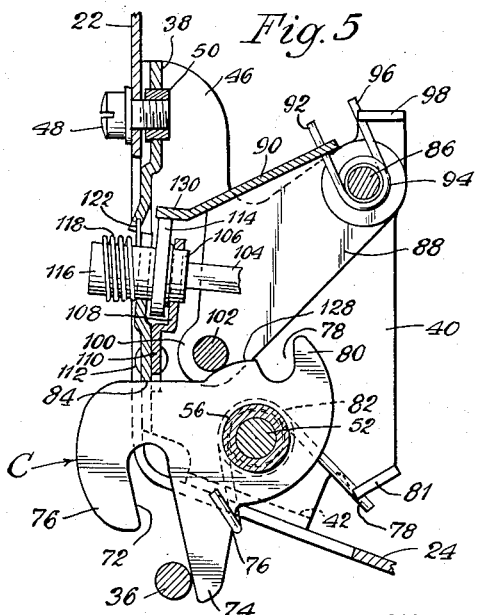
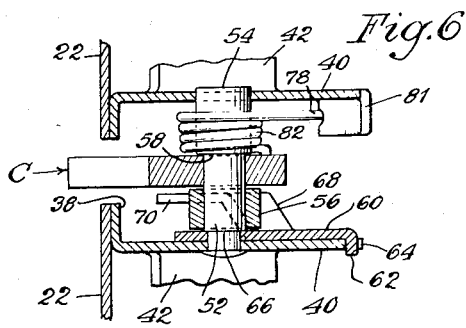
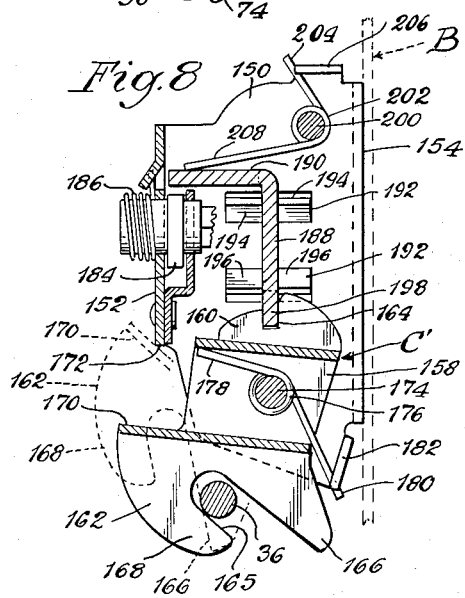
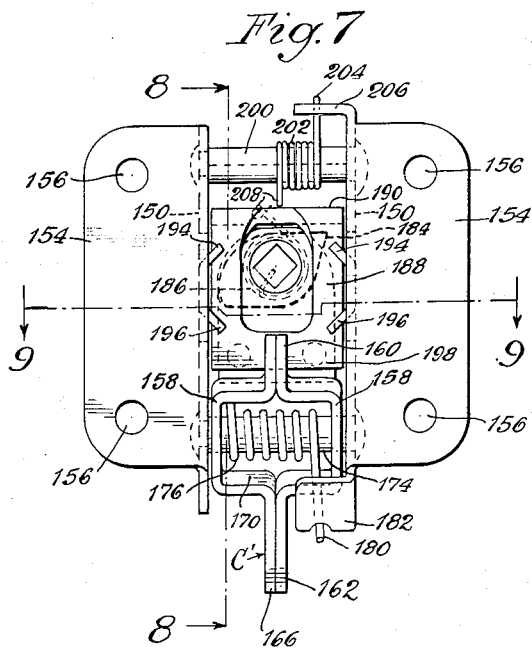
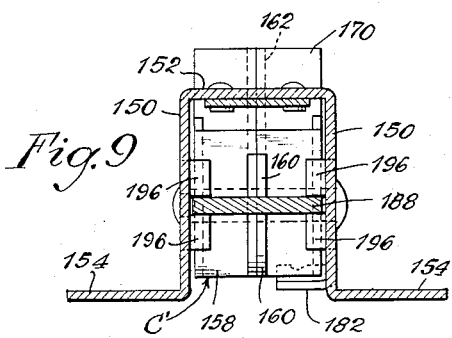
Inventor
Adam C. Lindner
by Parker & Carter
Attorneys

United States Patent Office 2,749,166
Patented June 5, 1956

2,749,166

LATCH FOR AUTOMOBILE DECK CLOSURE

Adam C. Lindner, Chicago, Ill., assignor to Chicago Forging and Manufacturing Company, Chicago, Ill., a corporation of Delaware Application December 22, 1952, Serial No. 327,356

2 Claims. (Cl. 292—216)

This invention relates to an improvement in latching or locking means, and has for one object a latch mechanism usable with automobiles.

Another object is a latch mechanism which is adaptable to secure the rear end or trunk closure of an automobile.

Another object is such a latch mechanism which shall be of simple, compact structure, with a minimum of parts.

Another object is such a latch which may readily be controlled by a key or handle, and which may be easily moved into locking position when the rear trunk door of an automobile is closed.

Other objects will appear from time to time in the ensuing specification and claims in which:

Figure 1 is a vertical sectional view of the rear end of an automobile trunk, illustrating the locked position;

Figure 2 is a section on the line 2—2 of Figure 1;

Figure 3 is a section on the line 3—3 of Figure 2, on an enlarged scale, with the parts in locked position;

Figure 4 is a section on the line 4—4 of Figure 3;

Figure 5 is a similar section, illustrating the parts in the unlocked position;

Figure 6 is a sectional view taken along line 6—6 of Figure 4;

Figure 7 is a view, similar to Figure 3, showing a modification of the invention;

Figure 8 is a sectional view along line 8—8 of Figure 7; and

Figure 9 is a sectional view along line 9—9 of Figure 7.

Like parts are indicated by like symbols throughout the specification and drawings.

Referring to the drawings, A generally indicates the rear end portion of an automobile body. It is shown as including a transverse sheet metal strip 10 with a recurved reinforcing layer 12. The strip 10 is secured to a bottom plate 14. An inclined plate 16, with its transverse top portion 18, constitutes, with the parts 10, 12, and 14, a transversely extending member which may be considered as forming the lower element of a door frame closed by the rear or trunk door generally indicated as B. The door includes a surface plate 20 and a spaced rear plate or portion 22, the two being connected about their edges by a suitable edge portion 24. It will be understood that the details of the door and the door frame do not, of themselves, form part of the present invention. It will be noted that the door frame has a recessed edge portion 26 to receive an opposed edge portion 28 of the door, to provide a relatively snug surface fit.

30 is a suitable plate or base adjustably mounted on the inclined member 16 of the rear end portion A of the automobile body. It may be slotted, as at 32, to receive a suitable locking screw or locking element 34, whereby the actual keeper member or loop 36 may be easily adjusted within an adequate but limited range of adjustment.

Positioned within the hollow of the trunk door B, and shown as secured to the members or portions 22 and 24, is a latch base including a front member 38 provided with preferably integral side members or plates 40 which extend therefrom in parallel relationship. The lower edge of each side plate 40 is provided with an outwardly extending lug or flange 42 which may be bolted, welded, or otherwise secured to the inner, upper surface of the edge portion 24, as at 44 in Figure 1. It will be noted that each side plate has an edge portion 46 of substantially the same length as the front member 38. The upper end of the bottom plate 38 may be secured to the inner surface of the spaced rear plate or portion 22 by any suitable means; for example, the securing screw 48 which may be screwed through any suitable nut 50 welded to the front member 38.

Mounted between the side plates 40 is the latch element, generally indicated as C, as shown, for example, in Figure 3. It has opposite parallel plane faces and is pivoted for rotation about a center 52. A suitable pivoting means may be employed, but a pin 54 may center and support a spacing sleeve 56 loose on the pin. The latch element C is held in position between a shoulder 58 of the pin 54 and the spacing sleeve 56. An element 60 has an ear 62 positioned and adapted to extend into a notch 64 of the side plate 40. It is held in position by a shoulder 66 on the pin 54. The member 60 is provided, also, with an offset portion 68 terminating in a guard arm 70. As will be clear, for example, from a comparison of the position of the parts in Figure 5, as contrasted to their position in Figure 4, the guard arm 70, in effect, closes a slot 72 in the latch element C when the latter is moved to the locked position.

The latch structure includes the latching slot 72 which is defined by an upper projection 74 and a lower projection 76. A limiting notch 78 is defined, in part, by an outward projection 80. The latch C is biased toward the unlocked position by a spring 82 coiled about pivot pin 54. One end of the spring engages the upper projection 74 of the latch, as at 76, and the other end, as at 78, engages a notched flange portion 81 inwardly offset from one of the side plates 40. Thus the spring 82 tends to move the latch C from the locked position in which it is shown in Figure 4 to the unlocked position as shown in Figure 5. The movement of the latch toward the unlocked position is limited by a limit stop or edge 84, whereas the movement of the latch toward locked position is limited by the limiting notch 78.

Pivoted on a pin, as at 86, is a detenting structure which includes side plates 88 connected by a preferably integrated cross plate 90. The upper end of plate 90 serves as a stop for one end 92 of a spring 94 coiled about the pivot pin 86. The opposite spring end 96 engages a notched, inwardly turned flange 98 of one of the side plates 40. The side plates 88 have end portions 100 which are substantially closer together than the main portions of the plates and, as shown, are connected by a bolt or cross-piece 102 which serves to hold the latch C in locked position by entering the limiting notch 78, as shown in Figure 4. It will be understood that the spring 94 tends normally to urge the pin 102 into contact with the opposed face of the latch C.

Positioned between the side plates 88 is a stub shaft 104 which is square in cross section and extends outwardly between the side plates 40. The inner end of the stub shaft fits into a circular bearing 106 that is held by a bearing support plate 108, the plate 108 being flared or fan-shaped at its upper end, as shown in Figure 3, and reduced or tapered inwardly to a stem portion 110 which is secured to the front plate 38 by a rivet 112 or any suitable securing means. The plate 38 and the bearing support 108 are bowed away from one another so as to provide an enclosed slot for a cam 114, which is approximately elliptically shaped. The cam is provided with an extension 116 which is surrounded by a coil spring 118, the spring having one end 120 attached to the extension 116 and its other end 122 secured to the plate 38. The bearing 106, the cam 114, and the extension 116 are one integral piece which is positioned so that the cam 114 resides between the bearing support plate 108 and the front plate 38, the extension 116 and the bearing 106 penetrating aligned holes in the respective plates. As shown in Figure 3, the coiled spring 118 biases the cam 114 and the stub shaft 104 counter-clockwise. The stub shaft 104 has secured at its outer end a handle component 124 with its cross handle portions 126. The handle may be provided with any conventional locking element that I have not alluded to in detail.

Assume that the invention is applied to the rear or trunk door of an automobile, such as is shown in Figure 1; the door cannot be opened until the latch C has been moved to the released or unlocked position of Figure 5. The door can then be lifted to the open position and held there by any suitable means, such as means not herein shown and which do not form part of the present invention. When the operator lowers the door to the closed position, the latch projection 74, which is held in the Figure 5 position by the spring 82, is rotated by contact with the fixed abutment or keeper 36 and is moved to the locked position of Figure 4. The above-described structure with its spring 94 normally holds the abutment or pin 102 against the opposite face 128 of the latch C. When the parts are in the unlocked position of Figure 5, the back of latch C engages the edge 84 of the plate 38 in response to action of the spring 82. However, when the latch is moved to the locked position of Figure 4, the same spring 82 is effective to hold the latch locked by maintaining a locking contact between the pin or abutment 102 and the notch 78. When the latch C is in the unlocked position of Figure 5 with the spring 82 holding the latch C in engagement with the edge 84, the pin 102 will be held against the face 128 so that the side plates 88 and upper plate 90 will be held in their raised position.

The side plates 88, the spring 94, the pin 102, and their associated structure constitute what might be considered a detenting or locking element for the latch C. From the locked position shown in Figure 4 this element is raised to the unlocked position of Figure 5 by counter-clockwise rotation of the handle component 124 and the stub shaft 104. The cam 114 engages an extension 130 on the upper plate 90 and rotates the detenting element clockwise, as shown in Figure 4, so as to raise and remove the pin 102 from the notch 78. This releases the latch C so that under the influence of the spring 82 it snaps to the Figure 5 position. Upon release of the handle component 124 the coil spring 94 rotates the detenting element counter-clockwise until the pin 102 engages the opposite face 128 on the latch C, as shown in Figure 5.

The embodiment shown in Figures 7, 8, and 9 is similar to that of the heretofore described embodiment in that it includes a pair of side plates 150, a front plate 152, the side plates having flanges 154 with appropriately disposed apertures 156 so that the entire structure can be secured within the hollow of a trunk door B. The latch element C' in this embodiment includes a pair of plates 158 which are flush with and welded to one another at their upper ends, as at 160, and their lower ends 162. Intermediate the upper and lower ends, the plates 158 are formed so as to curve outwardly from each other, and each of them includes a flat portion which is adjacent the inside of the side plate 150. The plates 158 are identical when they are punched out of sheet metal prior to receiving the right and left-hand bends shown in Figure 7. The upper ends 160 are provided with a notch 164 with which the detenting element cooperates. The lower end 162 has a latching slot 165 which is defined by an upper projection 166 and a lower projection 168, a forward surface 170 being adapted to engage and abut an edge 172 on the front wall 152. The latch C' is pivoted about a pin 174 which is positioned through a coil spring 176, one end 178 of the coil spring engaging the latch C' and the other end 180 engaging an abutment 182 which extends from the side plate 150. The spring 176 is adapted to bias the latch C' clockwise in Figure 8 so that when released, it will move to the unlocked position.

The handle structure and actuating cam, illustrated and described with reference to the embodiment of Figures 1 through 6, are substantially the same and fundamentally include a cam 184 which is biased counter-clockwise, as shown in Figure 7, by a coil spring 186.

The detenting or locking element consists of a vertically slidable plate 188 which, at its upper end, is bent at right angles so as to present a horizontally flat portion 190. The plate 188 is adapted to reciprocate vertically between a pair of guiding elements which include punched out tabs 192 on each side of the plate. As shown, the two pairs of guiding tabs are used with the plate, an upper pair 194 and a lower pair 196, all of the tabs 192 being punched inwardly toward the stub shaft of the handle component. The lower end 198 of the plate 188 is adapted to engage the upper portion 160 of the latch C and is received by the notch 164.

A pin 200 extends between the side plates 150 adjacent their upper edge and carries a coil spring 202, the upper end 204 of which engages an abutment 206 on one of the side plates, and the lower end 208 engages the flat portion 190 on the plate 188. The spring 202 is adapted to bias the detenting element downwardly so that the lower end 198 of the plate will engage the notch 164 in the upper portion 160 of the latch C'.

As shown in Figure 8, the detenting element is biased upwardly when the cam 184 is rotated counterclockwise in Figure 7 in that a camming portion thereon engages the under side of the flat portion 190 and overcomes the bias imparted by the spring 202 thus raising the lower end 198 of the plate 188 out of the notch 164 in the latch C'. This allows the latch to move from the locked position shown in full lines in Figure 8 to the unlocked position shown in dotted lines in Figure 8, the latch C' being rotated clockwise by the spring 178 until its forward portion 170 engages the abutting edge 172. When the trunk is lowered, the upper edge of the notch 165 engages the keeper member or loop 36 so that the latch C' will be rocked counter-clockwise, the lower portion of the detenting plate 188 sliding over the face of the latch C' until it is forced into the notch 164 under the bias of the spring 202. In this embodiment the detenting element reciprocates vertically between the guiding tabs 192 and is engaged on the under side of its flat portion 190 by the cam 184.

It will be realized that whereas I have described a practical and operative device, nevertheless many changes may be made in size, shape, number and disposition of parts without departing from the essence of the invention. I wish, therefore, that my description and drawings be taken in a broad sense as illustrative and/or diagrammatic rather than as limiting the invention to the precise showing of the present disclosure. It will be realized that although I have shown the invention as applied to the locking and unlocking of a trunk door on an automobile, it may be applied to other types of doors and closure units.

I claim:

1. In a latch assembly for relatively movable members in which a normally fixed keeper is mounted on one such member and a latch element is movably mounted on the other, a generally U-shaped plate mounted on one such member and forming therewith a housing, a latch element pivotally mounted in said housing and having a projection extending outwardly from said housing and adapted to engage the keeper on the other member in response to relative movement of the members, the latch element being movable about its pivot to locking position, a latch control member mounted in said housing for movement toward and away from said latching member, yielding means associated with said latch control member and with said latch element and adapted to urge said member and element toward each other, and manually operable means for separating said latch control member from said latch element, said last-named means including a rotatable camming member positioned adjacent said latch control member for actuating contact therewith upon rotation, and a separate housing, said camming member housing including a wall of said first-named housing, and a second wall secured to said first-named wall and spaced therefrom a distance sufficient to receive said camming member, said camming member including a cam element on and rotatable with a shaft, said shaft being rotatably mounted on said first-named wall and said second-named wall, said shaft having an end portion extending outwardly beyond the wall of said first named housing from said second wall and a spring surrounding said shaft, said spring having one end secured to said shaft and the other end in contact with the outer surface of said wall of said first named housing.

2. In a latch assembly for relatively movable members, in which a normally fixed keeper is mounted on one such member and a latch element is movably mounted on the other, a generally U-shaped plate mounted on one such member and forming therewith a housing, a latch element pivotally mounted in said housing in position to engage the keeper on the other member, a latch control member mounted in said housing for movement toward and away from said latching member, yielding means on said housing and positioned to urge said latch control member toward said latch element and manually operable means for separating said latch control member from said latch element against the action of said yielding means, said last named means including a shaft extending through said housing between said latch control member and said latch element, said shaft having a cam fixed thereon for rotation therewith, said cam being positioned to engage said latch control member to urge said latch control member out of engagement with said latch element in response to rotation of said shaft, said shaft being rotatably mounted in one wall of said housing, a second wall spaced inwardly from said housing wall within said housing, said shaft being journaled in said second wall, said cam being positioned between said housing wall and said second wall, said shaft having an end portion extending outwardly beyond said housing wall and having a spring surrounding said end portion beyond said housing wall, said spring having one end secured to said shaft and having its opposite end positioned against the outer surface of said housing wall.

References Cited in the file of this patent

UNITED STATES PATENTS

| | | |
|---|---|---|
| 1,316,595 | Rehdorf | Sept. 23, 1919 |
| 2,146,379 | Rediger | Feb. 7, 1939 |
| 2,267,397 | Dall | Dec. 23, 1941 |
| 2,301,221 | Marple | Nov. 10, 1942 |
| 2,639,177 | Smith | May 19, 1953 |
| 2,700,293 | Sigel et al. | Jan. 25, 1955 |